Figure 1:
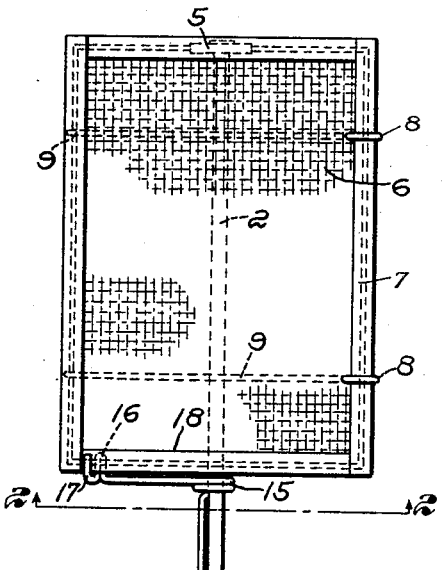

Oct. 29, 1929. W. L. HOOD 1,733,301
CORN POPPER
Filed Aug. 29, 1928

Inventor:
William L. Hood,
by Emery, Booth, Janney & Varney
Attys.

Patented Oct. 29, 1929

1,733,301

UNITED STATES PATENT OFFICE

WILLIAM L. HOOD, OF LEXINGTON, MASSACHUSETTS

CORN POPPER

Application filed August 29, 1928. Serial No. 302,836.

This invention relates to corn poppers and aims particularly to provide a novel and improved popper having, among others, the advantages hereinafter described and illustrated.

Figure 2:
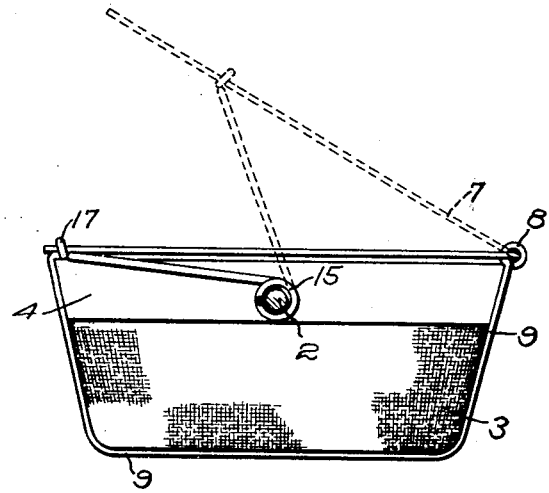

In the drawings of one embodiment of my invention selected for illustration and description herein,

Fig. 1 is a plan;

Fig. 2, a vertical section on the line 2—2 of Fig. 1; and

Figure 3:
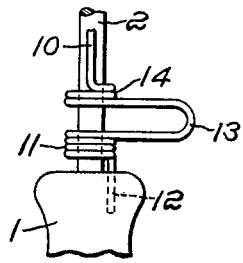
Figure 3:
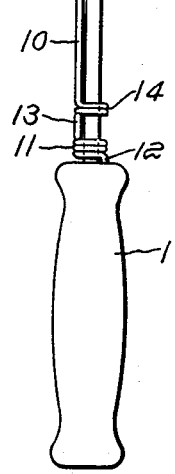

Fig. 3, a partial plan in detail, on an enlarged scale, of the handle or grip and cover actuating means.

Referring first to Fig. 1, my novel construction comprises a usual grip member 1 of suitable material as wood, having extending forwardly from one end a basket supporting handle, as a rod 2, preferably of metal, of suitable length and size.

At its outer end, Fig. 1, the rod 2 carries a usual basket 3 with a reinforcing band 4 for holding the corn, and it will be noted that the rod 2 passes through the inner end of the basket, entirely through the latter, and to the outer end of the basket, and is rigidly secured to the outer basket end by any convenient means as by bending the rod end over against the band 4, thus giving firm and adequate support to the basket and preventing the sagging of the basket where it is secured to the rod 2 or its equivalent, which usually occurs.

The cover 6, Figs. 1, 2, is hinged to one side basket edge 7 by the eyes 8 of the supporting rods 9, near each end of the basket and extending beneath the basket and up the opposite side to the top edge thereof, for giving additional support and stiffness to the basket proper.

The wire mesh of the basket is sufficiently small to hold the kernels of corn, and is preferably smaller than that of the cover 6, the latter being large enough to permit the kernels of corn which do not pop to be dumped out by inverting the basket and allowing them to fall through the cover.

For opening the cover of the basket conveniently with the thumb of the hand that holds the grip 1, I provide the novel means hereinafter described. About the rod 2, Figs. 1, 3, and near the grip 1, a stout wire 10 is coiled to form the loop 11, the end 12 of the wire being anchored in the adjacent end of the grip 1. This wire is then fashioned to form an elongated loop or finger piece 13 and is afterward coiled one or more times around the rod 2 to form a second rod engaging loop 14. It is then carried longitudinally of the rod 2 down to the basket where it is again coiled about the rod, forming a similar coil 15, these several coils 14 and 15 respectively acting to securely and movably fasten the cover opening spring member 10 to the rod 2.

At the basket end of the rod 2, Fig. 1, the wire 10 is carried laterally nearly to the side edge of the cover, is then bent forwardly a short distance, and then backwardly, forming a closed loop 16, and then bent forwardly again forming an open loop 17 which movably engages or receives the edge of the cover 6.

Obviously by placing the thumb upon the loop 13 and turning it to the right, Figs. 1, 3, the wire 10 will turn about the rod 2 causing the loop 17 to slide along the edge 18 of the cover and raise the same, as shown in dotted lines, Fig. 2. Upon release of the pressure upon the loop or finger piece 13, the natural resiliency of the wire coils will return it to its original position and close the cover of the basket, and act as a lock to hold it in closed position.

It will be noted that the construction described permits the basket cover to be raised and closed at any time by the hand grasping the grip, and that the wire rod 2 avoids all danger of the handle or grip being burned or scorched by continued use near the fire. The cover of the basket being hinged at one edge permits a more convenient raising of the same and dumping of the contents than would be the case if the cover were hinged at either end.

My invention is not restricted to the precise embodiment thereof described and illustrated herein, but is more particularly pointed out in the following claims.

Claims:

1. A corn popper comprising a handle, a basket thereon with a cover, and a cover actuating member coiled and rotatable about the handle and slidably engaging the cover.

2. A corn popper comprising a handle, a basket thereon with a cover, and a cover actuating member comprising a rod coiled about the handle and extended laterally to form a finger piece, next coiled again about the handle, extended longitudinally of the handle, again coiled about the latter, extended laterally and forked to slidably engage the basket.

3. A cover actuating member comprising a rod having a plurality of coils, a finger piece fashioned therein and a laterally extended arm with a cover engaging forked end fashioned thereon.

4. A corn popper comprising a basket, a handle therefor, and laterally rotatively operative means relative to the handle for opening the cover from the handle by pressure of the thumb of the hand grasping the handle.

5. A corn popper comprising a basket, a handle therefor, and laterally and resiliently operative means relative to the handle having sliding action on and relative to the cover for opening the cover from the handle by pressure of the thumb of the hand.

6. A corn popper comprising a basket, a handle therefor and means having a rotative action relative to and encircling the handle and sliding action relative to the cover, to open the latter.

7. A corn popper comprising a basket, a cover, a handle extended therethrough for increased support of the same, and rotative handle encircling means operable from the outer handle end for opening and closing the cover from one side edge thereof.

8. A corn popper comprising a perforated corn holding member, a cover therefor having larger perforations to permit dumping unpopped kernels therethrough, and means fixed upon the handle at one point and turnable thereon and engaging the cover, to open the latter.

9. A corn popper comprising a perforated basket, a cover therefor, a handle, and means fixed upon the handle and rotative about it and having a bifurcated end engaging the cover edge to open it.

10. Cover opening means comprising a longitudinally extended wire having coils at one end terminating in an anchoring end, and coils near the opposite end and terminating in a laterally extended cover edge engaging arm with a slotted end.

11. A corn popper comprising a basket, a handle thereon, and rotatively operative means coiled about the handle for closing the cover from the handle by uncoiling action of the operative means.

In testimony whereof, I have signed my name to this specification.

WILLIAM L. HOOD.